United States Patent [19]
Jones

[11] Patent Number: 6,139,615
[45] Date of Patent: *Oct. 31, 2000

[54] PEARLESCENT PIGMENTS CONTAINING FERRITES

[75] Inventor: Steven Alan Jones, New Providence, N.J.

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/031,925

[22] Filed: Feb. 27, 1998

[51] Int. Cl.$^7$ ..................................................... C04B 14/00
[52] U.S. Cl. .......................... 106/418; 106/417; 106/415; 106/456; 106/459
[58] Field of Search .................................... 106/415, 417, 106/418, 456, 457

[56] References Cited

U.S. PATENT DOCUMENTS

| | | | |
|---|---|---|---|
| 3,342,617 | 9/1967 | Jackson | 106/417 |
| 3,926,659 | 12/1975 | Bernhard et al. | 106/417 |
| 4,482,389 | 11/1984 | Franz et al. | 106/417 |
| 4,565,581 | 1/1986 | Bernhard | 106/417 |
| 5,091,011 | 2/1992 | DeLuca, Jr. | 106/417 |
| 5,169,442 | 12/1992 | Noguchi et al. | 106/417 |
| 5,223,034 | 6/1993 | Nitta et al. | 106/417 |
| 5,273,576 | 12/1993 | Sullivan et al. | 106/418 |
| 5,344,488 | 9/1994 | Reynders et al. | 106/425 |
| 5,401,306 | 3/1995 | Schmid et al. | 106/417 |
| 5,423,912 | 6/1995 | Sullivan et al. | 106/417 |
| 5,500,043 | 3/1996 | Harada et al. | 106/456 |
| 5,573,584 | 11/1996 | Ostertag et al. | 106/417 |

FOREIGN PATENT DOCUMENTS 5-137995  6/1993  Japan .

OTHER PUBLICATIONS

Derwent and JPAB abstracts for JP 11–273,932, Aug. 1999.
Database WPI; Section Ch, Week 8709; Derwent Publications Ltd., Lond, GB; Class D21, AN 87–061168; XP002098838 & JP 62 016408 A (Shiseido Co Ltd), Jan. 24, 1987.

*Primary Examiner*—C. Melissa Koslow
*Attorney, Agent, or Firm*—Ostrolenk, Faber, Gerb & Soffen, LLP

[57] ABSTRACT

A pearlescent pigment which is a ferrite-coated iron oxide-coated platy substrate in which the ferrite is substantially free of crystallites is obtained by adding metal ions to a slurry of hydrous iron compound and platy particles and then co-calcining in the metal and iron.

17 Claims, No Drawings

PEARLESCENT PIGMENTS CONTAINING FERRITES

BACKGROUND OF THE INVENTION

There are many known pearlescent or nacreous pigments which are based on micaeous or other lamellar substrates which have been coated with a metal oxide layer. As a result of reflection and refraction of light, these pigments exhibit a pearl-like luster. Depending on the thickness of the metal oxide layer, they can also exhibit interference color effects. A good description of this type of pigment can be found in U.S. Pat. Nos. 3,087,828 and 3,087,829.

The pearlescent pigments most frequently encountered on a commercial basis are titanium dioxide-coated mica and iron oxide-coated mica pearlescent pigments. It is also well-known that the metal oxide layer may be over-coated. For instance, said U.S. Pat. No. 3,087,828 describes the depositing $Fe_2O_3$ onto a $TiO_2$ layer while U.S. Pat. No. 3,711,308 describes a pigment in which there is a mixed layer of titanium and iron oxides on the mica that is overcoated with titanium dioxide and/or zirconium dioxide.

The oxide coating is in the form of a thin film deposited on the surfaces of the mica particle. The resulting pigment has the optical properties of thin films and thus the color reflected by the pigment arises from light interference which is dependent on the thickness of the coating. Since iron oxide has an inherent red color, a mica coated with this oxide has both a reflection color and an absorption color, the former from interference, the latter from absorption of light. The reflection colors range from yellow to red and the pigments are generally referred to as "bronze", "copper", "russet", etc. The pigments are used for many purposes such as incorporation in plastics and cosmetics as well as outdoor applications such as automotive paints.

Pearlescent pigments containing ferrites are also known. For example, U.S. Pat. No. 5,344,488 and DE 4120747 describe the deposition of zinc oxide onto mica platelets which had been coated with iron oxide. The U.S. patent states that in order to avoid the disadvantage of conventional zinc oxide/mica pigments, namely the tendency to agglomerate, and to obtain a pigment which had good skin compatibility, anti-bacterial action, favorable optical absorption properties and a surface color, the zinc oxide layer is applied to a previously prepared metal oxide-coated plate-like substrate. When calcined, small needle shaped crystallites are randomly distributed on the surface layer so that the zinc ferrite layer obtained is not entirely continuous. The patent states that unlike substrates covered entirely with zinc oxide in a continuous layer, the substrates covered with a layer containing crystallites show only a slight tendency to agglomeration.

The quality of a pearlescent pigment is generally dependent upon the smoothness or continuousness of the coating on the micaceous substrate. The quality of the pigment decreases rapidly with increasing discontinuities in the coating. Said U.S. Pat. No. 5,344,488 indicates that discontinuity is essential in order to avoid agglomeration. Therefore, quality must be sacrificed in order to obtain a usable pigment.

It is the object of the present invention to provide a ferrite coated micaceous pigment which is substantially free of needle-shaped crystallites and, therefore, has high quality. This and other objects of the invention will become apparent to those of ordinarily skill in this art.

SUMMARY OF THE INVENTION

This invention relates to a pearlescent pigment which is a ferrite-coated iron oxide-coated platy substrate in which the ferrite is substantially free of needle-shaped crystallites. The pigment is obtained by adding metal ions to a slurry of a hydrous iron compound and platy particles and then co-calcining the metal and hydrous iron oxide. The metal can be added before or while simultaneously, or after hydrolysizing the iron compound. The platy substrate can be natural mica, synthetic mica, glass flakes, $SiO_2$, $Al_2O_3$, metal-oxide (e.g., $TiO_2$)-coated mica, metal oxide-coated glass and the like.

DETAILED DESCRIPTION OF THE INVENTION

In accordance with the present invention, a pearlescent pigment is provided which is a ferrite-coated iron oxide-coated micaceous pigment in which the ferrite coating is substantially free of needle-shaped crystallites. The ferrite is usually completely free of crystallites and is a continuous layer, but the present invention does not exclude the existence of a stray crystallite or two.

A ferrite is a double oxide of iron oxide and another metal oxide such as zinc oxide. Ferrites generally conform to the formula $MFe_2O_4$ in which M is one or a mixture of metals which can exist in a divalent state such as calcium, strontium, barium, zinc, cadmium, manganese, magnesium, cobalt, nickel, copper and the like. The pearlescent pigment of this invention is made by combining a source of the metal M with an iron compound and the platy substrate, preferably mica, causing both the iron and metal M to deposit on the substrate and then co-calcining the iron and metal M. Hydrolysis of the hydrous iron compound can be done either before (preferably), while or after the metal source is added.

The preparation of iron oxide-coated micaceous pearlescent pigments is well known in the art and the process need not be described in any detail here. In broad terms, an iron source is combined with the mica substrate to form a slurry, usually aqueous, and the reaction conditions are adjusted such that a hydrous iron compound is deposited on the mica substrate, followed by hydrolysis. Adjusting the pH of the system into a basic value is usually accomplished by adding a base to the mixture. Typically bases include sodium hydroxide and potassium hydroxide. This process can also be carried out, if desired, in the vapor phase.

At any time prior to the calcining of the iron-coated mica, a source of the metal M is combined with the reactants. Any source of the metal can be used as long as it does not interfere with the formation of an iron oxide or ferrite coating or causes the formation of crystallites. Thus, metal oxides, metal salts such as the chloride or sulfate and the like or even metal complexes can be employed. In those instances where the mica is present in aqueous slurry form, the metal salt is preferably one which is soluble in water.

The metal source is usually added and the metal deposited on the substrate after the hydrous iron compound has already been deposited. However, if desired, the metal can be added before the hydrous iron compound is caused to deposit on the mica substrate.

After the iron and metal have been deposited, the coated substrate is washed and/or calcined in the conventional fashion as if an iron oxide-coated mica pearlescent pigment was being prepared. As a result of the calcination, a dual layer coating is obtained with iron oxide adjacent the mica substrate and a ferrite layer on top of the $Fe_2O_3$ layer. The relative thickness of the two layers is a function of the quantity of the metal relative to the quantity of the iron. In general, the Fe:M molar ratio can range from about 1–10, preferably about 2–5. When the Fe/M ratio is large, the Fe$_2$O$_3$ layer adjacent to the mica substrate is relatively thick and the ferrite layer is relatively thin. As the ratio decreases, the relative amount of the iron oxide layer decreases and the relative thickness of the ferrite layer increases while the absolute thickness of the coating increases.

Consider, for example, an iron oxide-coated mica pigment in which both the absorbance and reflectance is red. The coating layer in this instance is about 80 nm thick and is 100% ferric oxide. When zinc is deposited at an Fe:Zn ratio of 11.4, the total thickness of the coating increases to 88 nm of which about 75% is ferric oxide and 25% is zinc ferrite. The absorbance and reflectance of this pigment is orangish-red. At an Fe:Zn ratio of 5.2, the thickness of the coating has increased to 95 nm of which about 50% is ferric oxide and 50% is zinc ferrite. At an Fe:Zn ratio of 3.1, the thickness of the coating has increased to 105.8 nm of which about 25% is ferric oxide and 75% is zinc ferrite.

As the thickness of the total coating increases, the absorbance and reflectance, which initially are the same, increasingly diverge. For instance, where the Fe:Zn ratio was 11.4, the absorbance and reflectance were both orangish/red but when the ratio had increased to 3.1, the absorbance was orangish-yellow while the reflectance was red. Thus, unique color effects can be obtained.

In order to further illustrate the present invention, various examples are set forth below. In these examples, as throughout these specification and claims, all temperatures are degree Centigrade and parts and percentages are by weight unless otherwise indicated.

EXAMPLE 1

A slurry where 50 g of mica (average particle size of 20 μm) previously coated with 39% FeCl$_3$ to a bronze color was heated to 74° C. and the pH was adjusted to 8.5 by adding aqueous NaOH. An aqueous solution of ZnCl$_2$ was added over the course of about 1 h to deposit hydrous zinc oxide onto the hydrous iron oxide coated mica while the pH was maintained with NaOH. Enough Zn was added to achieve an Fe/Zn ratio of 4.5. The slurry was then filtered, washed and calcined at 900° C. yielding a lustrous pearlescent pigment with an intense golden bronze color.

EXAMPLE 2 (COMPARATIVE)

A slurry of 78 g of a calcined iron oxide coated mica pigment having a bronze color (equivalent to 50 g of mica) in 500 ml of distilled water was heated to 74° C. and the pH was adjusted to 8.5 with aqueous NaOH. An aqueous solution of ZnCl$_2$ was added over the course of about 1 h to deposit hydrous zinc oxide onto the iron oxide coated mica while the pH was maintained with NaOH. Enough Zn was added to achieve an Fe/Zn ratio of 4.5. The slurry was then filtered, washed and calcined at 900° C. yielding a bronze colored pearlescent pigment.

EXAMPLE 3

The general procedure of Example 1 was followed except that the hydrous iron oxide had a copper color. The product obtained a lustrous pearlescent pigment with an intense golden orange color.

EXAMPLE 4 (COMPARATIVE)

The general procedure of Example 2 was followed except that the calcined pigment had a copper color. The product obtained was an orange colored pearlescent pigment.

EXAMPLE 5

The general procedure of Example 1 was followed except that the hydrous iron oxide had a russet color and the Fe/Zn ratio was 5.4. The product obtained was a lustrous pearlescent pigment with an intense orange color. The SEM photomicrograph at 71,000 magnification shows a smooth continuous layer of the ZnFe$_2$O$_4$ that was formed by co-calcination of the hydrous zinc and iron oxides.

EXAMPLE 6 (COMPARATIVE)

The general procedure of Example 2 was followed except that the calcined iron oxide had a russet color and the Fe/Zn ratio was 5.4. The product obtained was a reddish orange colored pearlescent pigment. The SEM photomicrograph at 71,000 magnification shows the discontinuous coverage of needle like crystallites of the ZnFe$_2$O$_4$ that was formed by the two step process of the prior art.

EXAMPLE 7

L*,a*,b* data of the pigments obtained in Examples 1–6 were measured using a spectrophotometer and are listed in Table 1. See "The Measurement of Appearance", 2nd Edition, edited by Hunter and Harold Bryant John Wiley & Sons, 1987. The CIELab measurements characterize the appearance of the product in terms of its lightness-darkness component, symbolized by L*, a red-green component represented by a* and a yellow-blue component symbolized by b*. Two additional parameters can be derived from the L*,a*,b* data; the chroma (C) i.e., $[(a*)^2+(b*)^2]^{1/2}$ and the hue (H) i.e., arctan (b*/a*). Chroma refers to the intensity or vividness of the color and the hue to the color shade of the product.

The data in Table 1 compare the chroma and hue obtained by the present invention and by prior art in pairs, where each pair is a particular iron content and Fe/Zn ratio. One can clearly see that the pigments of the present invention have higher chroma and hues that have changed more significantly from the color of the original ferric oxide than those prepared by the prior art. These differences represent the smooth continuous layer of a ferrite formed by the present invention compared to the discontinuous layer of crystallites in the prior art.

TABLE 1

| Example | L* | a* | b* | C | H |
|---|---|---|---|---|---|
| 1 | 272.35 | 7.99 | 45.73 | 46.42 | 80.09 |
| 2 | 239.29 | 9.81 | 34.47 | 35.84 | 74.11 |
| 3 | 247.19 | 27.91 | 64.28 | 70.08 | 66.53 |
| 4 | 232.80 | 29.86 | 36.02 | 46.79 | 50.34 |
| 5 | 234.52 | 41.03 | 48.03 | 63.18 | 49.49 |
| 6 | 214.33 | 38.02 | 18.97 | 42.49 | 26.51 |

EXAMPLE 8

A slurry where 50 g of mica (average particle size 20 μm) previously coated with 39% FeCl$_3$ to a russet color was heated to 75° C. and the pH was left unadjusted at about 3. Enough ZnCl$_2$ solution was added over the course of about 20 min with the pH unregulated to achieve an Fe/Zn ratio of 4.5. The pH was then slowly raised to 8 by adding aqueous NaOH to deposit hydrous zinc oxide onto the hydrous iron oxide coated mica. The slurry was then filtered, washed and calcined at 900° C. producing a lustrous orange colored pearlescent pigment.

EXAMPLE 9

A slurry of 50 g of mica (average particle size 20 μm) previously coated with 39% FeCl$_3$ to a russet color was filtered, washed and reslurried before heating to 74° C. and adjusting the pH to 9.5. A solution of ZnCl$_2$ was added over the course of about 20 min to deposit hydrous zinc oxide onto the hydrous iron oxide coated mica while the pH was maintained with NaOH. Enough Zn was added to achieve an Fe/Zn ratio of 5.4. The slurry was then filtered, washed and calcined at 900° C. producing a lustrous pearlescent pigment with an intense orange color.

EXAMPLE 10

A slurry of 50 g of mica (average particle size 15 μm) previously coated with 39% FeCl$_3$ to a russet color was heated to 75° C. and the pH was adjusted to 8 with aqueous NaOH. An aqueous solution of ZnCl$_2$ was added over the course of about 40 min to deposit hydrous zinc oxide onto the hydrous iron oxide coated mica while the pH was maintained with NaOH. Enough Zn was added to achieve an Fe/Zn ratio of 3.6. The slurry was then filtered, washed and calcined at 900° C. producing a lustrous pearlescent pigment with an intense orange color.

EXAMPLE 11

A slurry of 50 g of mica (average particle size 20 μm) previously coated with 39% FeCl$_3$ to a russet color was heated to 75° C. and the pH was adjusted to 9.5 with aqueous NaOH. An aqueous solution of MnCl$_2$ was added over the course of about 40 min to deposit hydrous manganese oxide onto the hydrous iron oxide coated mica while the pH was maintained with NaOH. Enough Mn was added to achieve an Fe/Mn ratio of 4. The slurry was then filtered, washed and calcined at 900° C. and yielding a lustrous pearlescent pigment with a dark purple color.

EXAMPLE 12

A slurry of 50 g of mica (average particle size 20 μm) previously coated with 39% FeCl$_3$ to a bronze color was heated to 75° C. and the pH was adjusted to 9 with aqueous NaOH. An aqueous solution of CuCl$_2$ was added over the course of about 1 h to deposit hydrous copper oxide onto the hydrous iron oxide coated mica while the pH was maintained with NaOH. Enough Cu was added to achieve an Fe/Cu ratio of 2. The slurry was then filtered, washed and calcined at 900° C. and yielding a lustrous brown colored pearlescent pigment.

EXAMPLE 13

A slurry of 50 g of mica (average particle size 20 μm) previously coated with 39% FeCl$_3$ to a bronze color was heated to 75° C. and the pH was adjusted to 9 with aqueous NaOH. An aqueous solution of MgCl$_2$ was added over the course of about 2 h to deposit hydrous magnesium oxide onto the hydrous iron oxide coated mica while the pH was maintained with NaOH. Enough Mg was added to achieve an Fe/Mg ratio of 2. The slurry was then filtered, washed and calcined at 900° C. and yielded a lustrous yellow-brown pearlescent pigment.

EXAMPLES 14–18

Following the procedure of Example 1, a series of pearlescent pigments were prepared where the Fe/Zn ratio was varied and the color characteristics of those products were evaluated by measuring the L*a*b* data against a black and white drawdown card using a spectrophotometer. The L*a*b* data measured over the black and white portions of the drawdown card are set forth in Tables 2 and 3 below.

TABLE 2

Increasing Zn level, interference color over black

| Example | Fe/Zn | L* | a* | b* | C | H |
|---|---|---|---|---|---|---|
| 14 | 4.50 | 233.88 | 35.16 | 29.08 | 45.63 | 39.60 |
| 15 | 3.80 | 230.46 | 36.56 | 34.51 | 50.28 | 43.35 |
| 16 | 3.25 | 218.68 | 36.60 | 38.53 | 53.14 | 46.47 |
| 17 | 2.80 | 222.74 | 34.89 | 37.73 | 51.39 | 47.24 |
| 18 | 2.43 | 223.18 | 32.53 | 25.42 | 41.29 | 38.00 |

TABLE 3

Increasing Zn level, absorbance color over white

| Example | Fe/Zn | L* | a* | b* | C | H |
|---|---|---|---|---|---|---|
| 14 | 4.50 | 45.82 | 28.57 | 33.71 | 44.19 | 49.72 |
| 15 | 3.80 | 47.93 | 27.73 | 34.93 | 44.60 | 51.55 |
| 16 | 3.25 | 49.03 | 27.59 | 37.86 | 46.84 | 53.92 |
| 17 | 2.80 | 51.63 | 26.23 | 40.68 | 48.40 | 57.19 |
| 18 | 2.43 | 56.58 | 23.44 | 42.94 | 48.92 | 61.37 |

Note that the hue measured over the black portion of the drawdown card first increases from a redder shade of orange to a more yellow orange with increasing amounts of zinc, and then back to a redder orange with higher levels of zinc. The fluctuation of the interference color is indicative of having two layers, one Fe$_2$O$_3$ and the other ZnFe$_2$O$_4$. With low zinc levels, the pigment is closer to a pure Fe$_2$O$_3$ layer, which in this Example has a red interference color. As more zinc is added, the zinc ferrite layer grows at the expense of the ferric oxide so that at one level, the ferrite oxide layer is effectively thinner with an orange interference color while the zinc ferrite is thick enough to also have an orange (presumed) interference color. When more zinc is added, the ZnFe$_2$O$_4$ layer grows thick enough to have a red interference color.

The hue measured over the white portion of the card to read the absorption color shows that the hue becomes more yellow as the yellow-orange zinc ferrite replaces the red ferric oxide.

EXAMPLE 19

A slurry of 50 g of glass flake (average particle size 100 μm) previously coated with 39% FeCl$_3$ to a russet color was heated to 74° C. and the pH was adjusted to 9.5 by adding NaOH. An aqueous solution of ZnCl$_2$ was added over the course of about 20 min to deposit hydrous zinc oxide onto the hydrous iron oxide-coated glass flake while the pH was maintained with NaOH. Enough Zn was added to achieve an Fe/Zn ratio of 10. The slurry was then filtered, washed and calcined at 700° C. The resulting product was a lustrous pearlescent pigment with an intense orange color.

EXAMPLE 20

A slurry where 100 g of a titanium dioxide-coated mica with a pearl color (average particle size 20 μm) in 500 mg of distilled water was heated to 75° C., and the pH was adjusted to 4.3. To the slurry was added an aqueous solution of FeCl$_3$ and ZnCl$_2$ where the Fe/Zn ratio was 2. The pH was held constant during the addition with aqueous NaOH. The slurry was then filtered, washed and calcined at 900° C. yielding a lustrous bright orange colored pearlescent pigment.

EXAMPLES 21–27

The procedure of Example 1 was followed where the zinc was replaced with cobalt, nickel, calcium, barium, strontium, cadmium and lead, respectively.

Various changes and modifications can be made in the process and products of the present invention without departing from the spirit and scope thereof. The various embodiments which have been set forth herein were for the purpose of further illustrating the invention but were not intended to limit it.

What is claimed is:

1. A pearlescent pigment comprising a platy pigment and a coating on the platy pigment comprising a ferrite, where the coating is substantially free of needle shaped crystallites and the ferrite has the formula $MFe_2O_4$ in which M is a divalent metal and the Fe/M molar ratio in the coating is 1 to 10.

2. The pearlescent pigment of claim 1 in which the ferrite is of the formula $MeFe_2O_4$ in which M is a divalent metal and the Fe/M molar ratio is 2 to 5.

3. The pearlescent pigment of claim 2 in which M is selected from the group consisting of calcium, strontium, barium, zinc, cadmium, manganese, cobalt, magnesium, nickel and copper.

4. The pearlescent pigment of claim 3 in which the ferrite coating is free of crystallites.

5. The pearlescent pigment of claim 4 in which M is Zn.

6. The pearlescent pigment of claim 2 in which M is selected from the group consisting of calcium, strontium, barium, zinc, cadmium, manganese, cobalt, magnesium, nickel and copper.

7. The pearlescent pigment of claim 6 in which the ferrite coating is free of said crystallites.

8. The pearlescent pigment of claim 7 in which M is Zn.

9. The pearlescent pigment of claim 1, wherein the platy substrate of the platy pigment is selected from the group consisting of mica, glass, metal oxide-coated mica and metal oxide-coated glass flakes.

10. A method of making the pearlescent pigment of claim 1 comprising depositing one or a mixture of metals capable of forming a ferrite by reaching with iron and a hydrous iron compound on platy particles and calcining the resulting combination.

11. The method of claim 10 in which the metal is selected from the group consisting of calcium, strontium, barium, zinc, cadmium, manganese, magnesium, cobalt, nickel and copper.

12. The method of claim 11 in which the iron to metal ratio is about 2–5.

13. The method of claim 12 in which the metal is zinc.

14. The method of claim 10 in which the metal is zinc.

15. The method of claim 14 in which the iron to metal molar ratio is about 2–5.

16. The method of claim 10 in which the hydrous iron compound is deposited on the particles before the metal is deposited thereon.

17. The method of claim 10, wherein the platy particle is selected from the group consisting of mica, glass, metal oxide-coated mica and metal oxide-coated glass flakes.

* * * * *